United States Patent
Hernandez, Jr. et al.

(10) Patent No.: US 7,404,563 B2
(45) Date of Patent: Jul. 29, 2008

(54) REVERSIBLE DRILL AND DRIVE TOOL II

(75) Inventors: Hector Ray Hernandez, Jr., Fullerton, CA (US); George Hillinger, Los Angeles, CA (US)

(73) Assignee: Alltrade Tools LLC, Long Beach, CA (US)

( * ) Notice: Subject to any disclaimer, the term of this patent is extended or adjusted under 35 U.S.C. 154(b) by 335 days.

(21) Appl. No.: 11/364,287

(22) Filed: Feb. 28, 2006

(65) Prior Publication Data

US 2007/0201964 A1 Aug. 30, 2007

(51) Int. Cl.
*B23B 51/08* (2006.01)
(52) U.S. Cl. .......................... 279/14; 408/239 R; 7/165
(58) Field of Classification Search .................... 279/14, 279/143; 408/239 R; 7/158, 165; *B23B 51/08*
See application file for complete search history.

(56) References Cited

U.S. PATENT DOCUMENTS

| | | | | | |
|---|---|---|---|---|---|
| 187,600 | A | * | 2/1877 | Collins | 408/20 |
| 327,969 | A | * | 10/1885 | Stowe | 279/14 |
| 699,773 | A | * | 5/1902 | Stump | 7/168 |
| 1,697,414 | A | * | 1/1929 | Cordray | 279/14 |
| 4,512,693 | A | * | 4/1985 | Swanson | 408/239 R |
| 4,676,703 | A | * | 6/1987 | Swanson | 408/239 R |
| 4,848,197 | A | * | 7/1989 | Kikel | 81/440 |
| 5,450,775 | A | * | 9/1995 | Kozak | 81/440 |
| 7,237,987 | B2 | * | 7/2007 | Hernandez et al. | 408/239 R |

* cited by examiner

*Primary Examiner*—Monica S. Carter
*Assistant Examiner*—Eric A Gates
(74) *Attorney, Agent, or Firm*—Fulwider Patton LLP

(57) ABSTRACT

A tool includes a pair of spaced apart substantially parallel arms carrying a mounting member to which are detachably connected axially oriented driver and drill elements. The mounting member is moveable along the arms reciprocally between a first position where it is manually rotated to select the axial orientation of the driver and drill elements and a second locked position to hold the driver and drill elements in a selected axial orientation until the mounting member is return to the first position. The locking function is provided by a spring element actuated upon the mounting member being moved from the first position to the second position to apply pressure against the mounting member while in the second position.

19 Claims, 11 Drawing Sheets

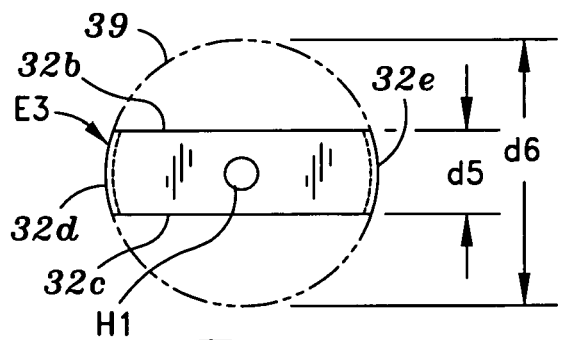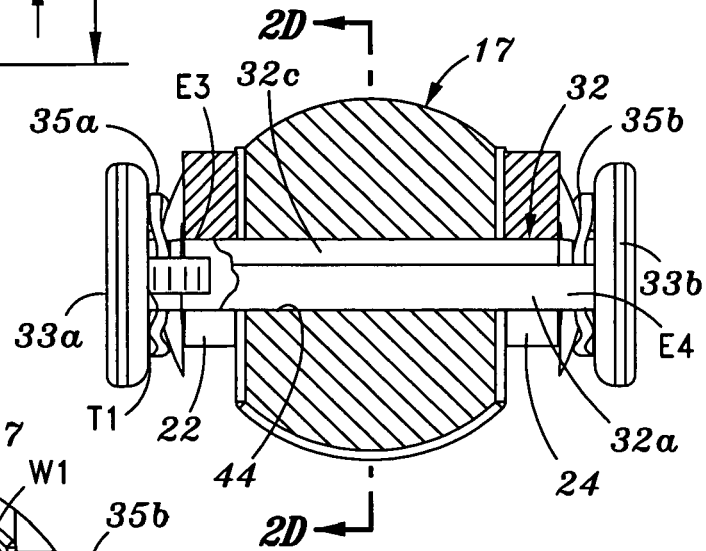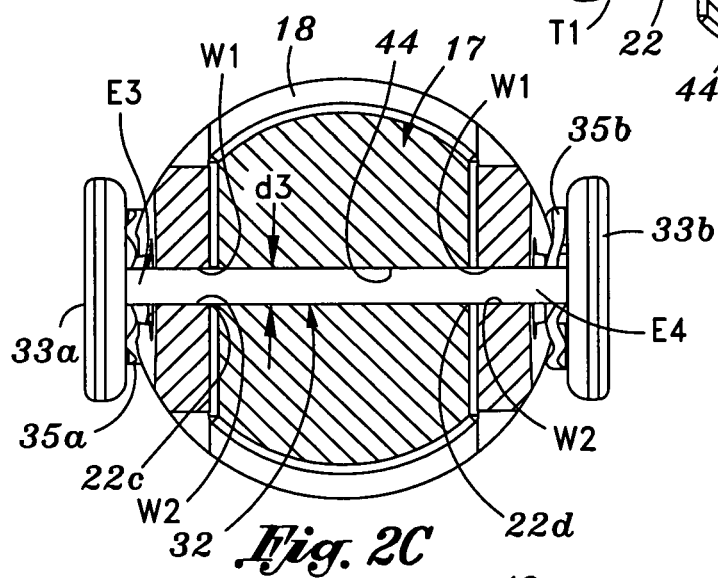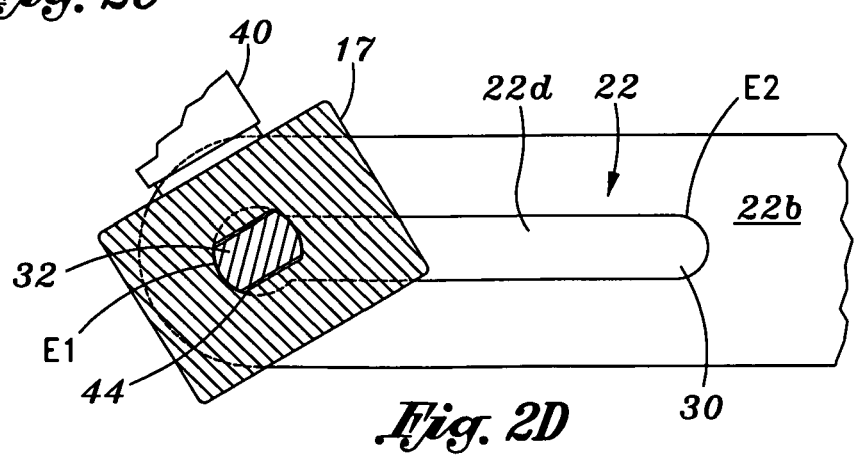

REVERSIBLE DRILL AND DRIVE TOOL II

INCORPORATION BY REFERENCE

The inventors incorporate herein by reference any and all U.S. patents, U.S. patent applications, and other documents, hard copy or electronic, cited or referred to in this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF INVENTION

In the construction and renovation of commercial and residential buildings as well as in various manufacturing operations, it is often necessary to perform repeated drilling and driving operations. For example, a hole is drilled into a wall or ceiling surface and then a screw or other type of fastener is driven into the drilled hole. U.S. patent application Ser. No. 10/902,732, filed Jul. 29, 2004, entitled Reversible Drill and Drive Tool, assigned to Alltrade Tools LLC, and U.S. Pat. Nos. 4,512,693 and 4,676,703 are illustrative of tools that can be attached to a power drill to allow this drill to both drill a hole and drive in a screw or another type of fastener.

SUMMARY OF INVENTION

This invention has one or more features as discussed subsequently herein. After reading the following section entitled "DETAILED DESCRIPTION OF SOME EMBODIMENTS OF THIS INVENTION," one will understand how the features of this invention provide its benefits. The benefits of this invention include, but are not limited to: simplicity of manufacture due to reduction of the number of components, improved precision due to enhanced axial alignment of driver and drill elements, sturdy construction, ease of operation, convenience of use, increased speed to change bits thereby saving time, and enhanced safety.

Without limiting the scope of this invention as expressed by the claims that follow, some, but not necessarily all, of its features are:

One, the tool of this invention includes a bifurcated body having a pair of spaced apart arms, which may be substantially parallel. A mounting member is attached to the arms. Detachable, axially oriented driver and drill elements extend outward from the mounting member in opposite directions. The mounting member is moveable along the arms reciprocally between a first position where it may be manually rotated in either a clockwise or counter-clockwise direction to select the axial orientation of the driver and drill elements and a second locked position to hold the driver and drill elements in a selected axial orientation until the mounting member is return to the first position.

Two, the locking function is provided in part by a spring element actuated upon the mounting member being moved from the first position to the second position to apply pressure against the mounting member while in the second position. On one or both arms may be a ramp section that is interactive with the spring element to place the spring element in compression as the mounting member is moved from the first position to the second position and to decompress the spring element as the mounting member is moved from the second position to the first position. Each arm may terminate in a free end and one or both arms may have an exterior surface providing the ramp section. The exterior surface may slope or taper inward from an intermediate portion to the free end to provide a sloping ramp section.

Three, a guide-way may be provided for the mounting member. For example, an elongated slit in each arm may extend lengthwise along the ramp section. Each slit may have an outer end, an inner end, and a substantially linear corridor connecting the outer and inner ends. The outer end may be nearby the free end of an arm and the inner end may be nearby an intermediate portion of an exterior surface of an arm. Each slit may be substantially symmetrical about a longitudinal centerline. The slits in the arms may be directly opposed to each other and have essentially the same dimensions and each slit may have opposed walls that are substantially parallel to each other. Alternately, each slit may have opposed walls that taper inward from the outer end of the slit to the inner end of the slit to form an angle between the tapering walls that is greater than substantially 0.5°.

Four, the mounting member may be a block including opposed first and second sides. The driver element may be detachably connected to the first side, the drill element may be detachably connected to the second side, and the driver element and drill element may be aligned and axially oriented in opposed directions. The block may be positioned between the free ends of the arms and connected thereto by a pivot member carrying the block. The pivot member has opposed ends that may be positioned with one end in each slit in an arm to enable the block member to be manually moved reciprocally between the first position near the free ends to the second position near inner ends of the slits. The pivot member rides along the slits.

Five, a supplemental locking mechanism nearby an inner end of at least one of the slits may be provided. For example, this supplemental locking mechanism may be a detent mechanism included as a portion of the pivot member.

These features are not listed in any rank order nor is this list intended to be exhaustive.

DESCRIPTION OF THE DRAWING

Some embodiments of this invention, illustrating all its features, will now be discussed in detail. These embodiments depict the novel and non-obvious tool of this invention as shown in the accompanying drawing, which is for illustrative purposes only. This drawing includes the following figures (Figs.), with like numerals indicating like parts:

FIG. 2A is an end view of the shaft of the pivot member taken along line 2A-2A of FIG. 2.

FIG. 2B is a cross-sectional view taken along line 2B-2B of FIG. 10, illustrating the mounting member in the unlocked position and being rotated.

FIG. 2C is a cross-sectional view taken line 2C-2C of FIG. 8, illustrating the mounting member in the locked position where it cannot rotated.

FIG. 2D is a cross-sectional view taken along line 2D-2D of FIG. 2B during rotation.

DETAILED DESCRIPTION OF SOME EMBODIMENTS OF THIS INVENTION

General

Figure 1:
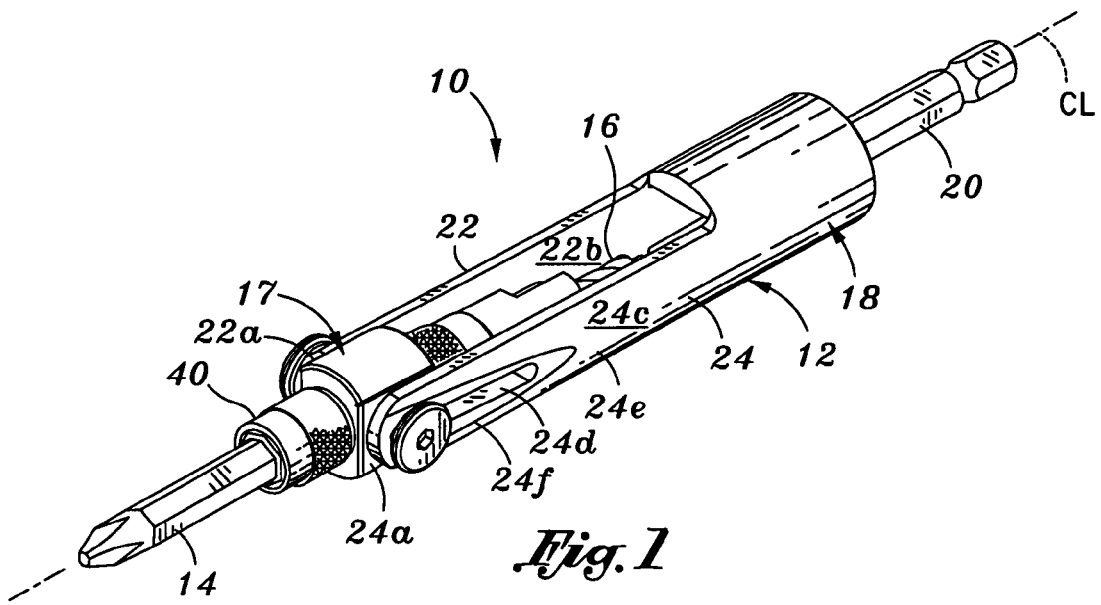
FIG. 1 is a perspective view of one embodiment of the tool of this invention.
Figure 2:
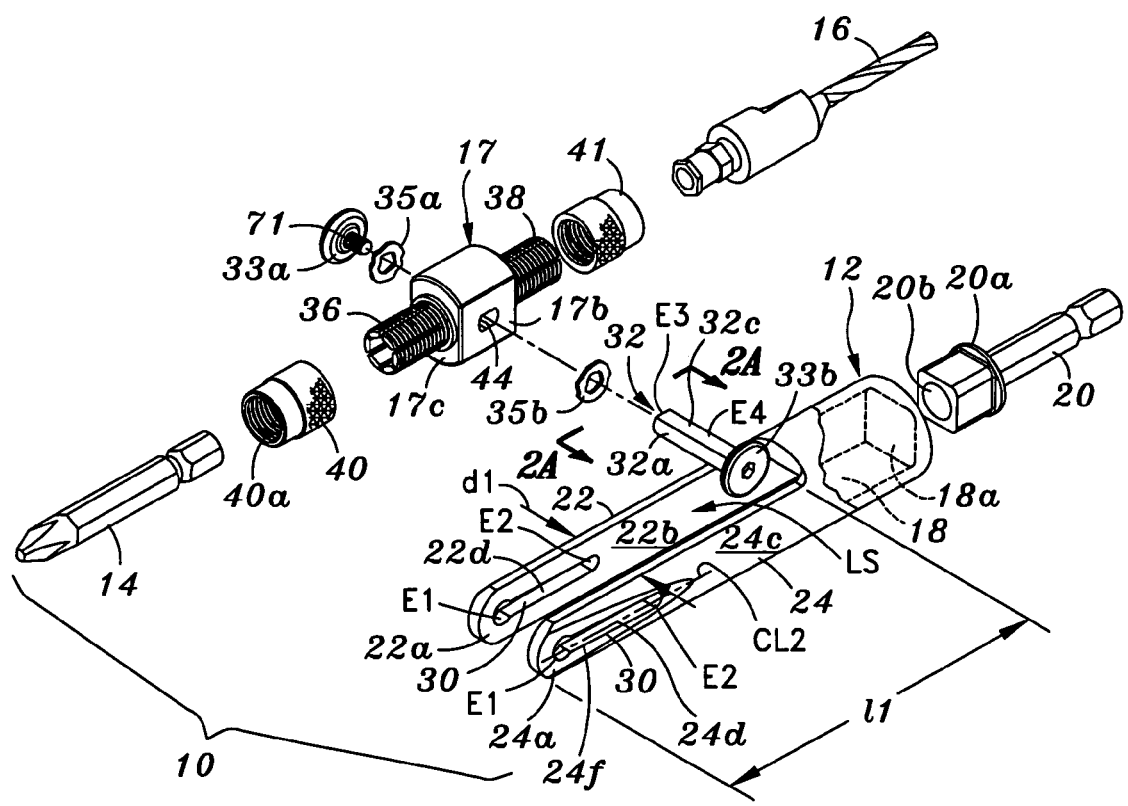
FIG. 2 is an exploded perspective view of the tool shown in FIG. 1.
Figure 3:
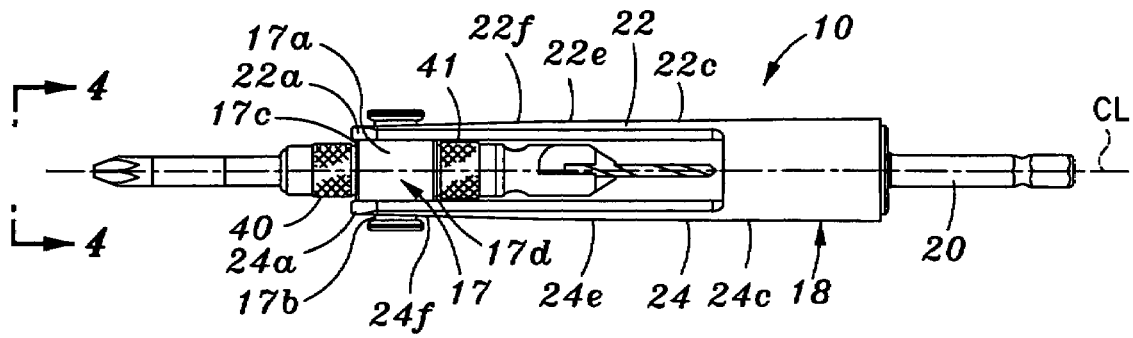
FIG. 3 is a top plan view of the tool shown in FIG. 1 illustrating the mounting member in an unlocked position, allowing the mounting member to be rotated as depicted in FIG. 10.
Figure 4:
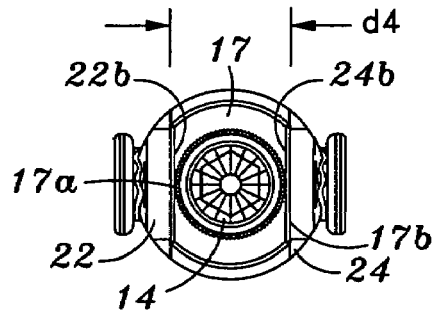
FIG. 4 is an end view taken along line 4-4 of FIG. 3.
Figure 10:
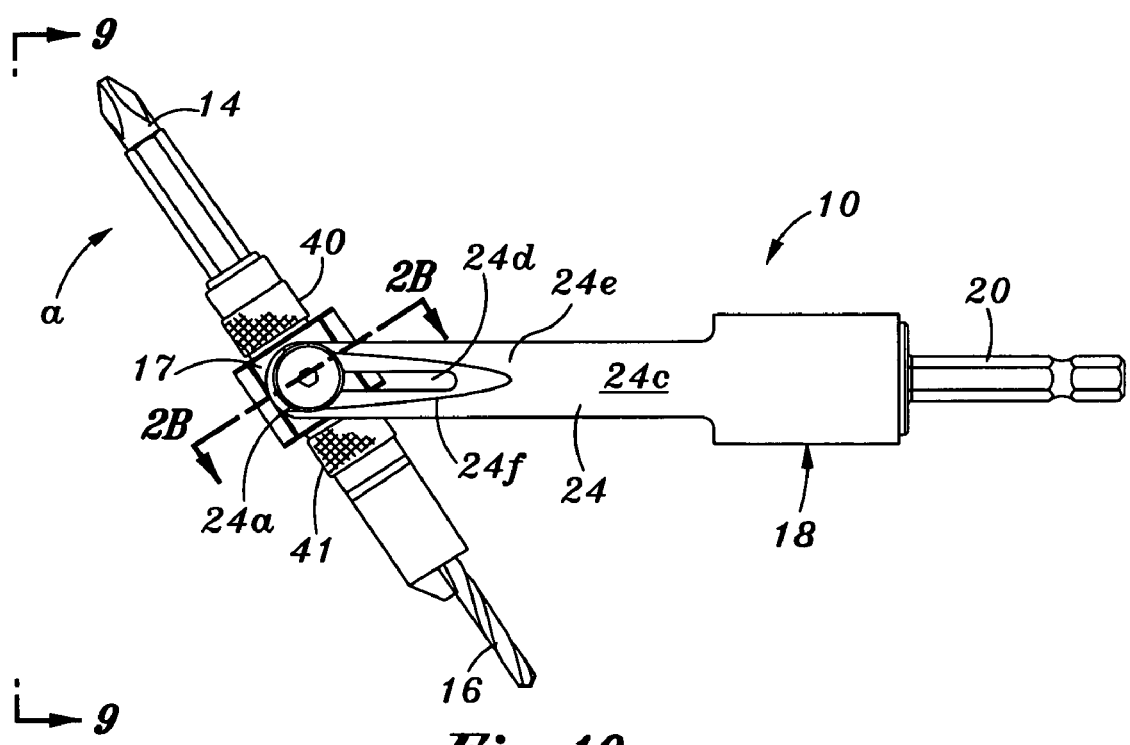
FIG. 10 is a side view of the tool shown in FIG. 1 as the mounting member is being rotated to move the driver element from an operational position into a non-operational position.
Figure 14:
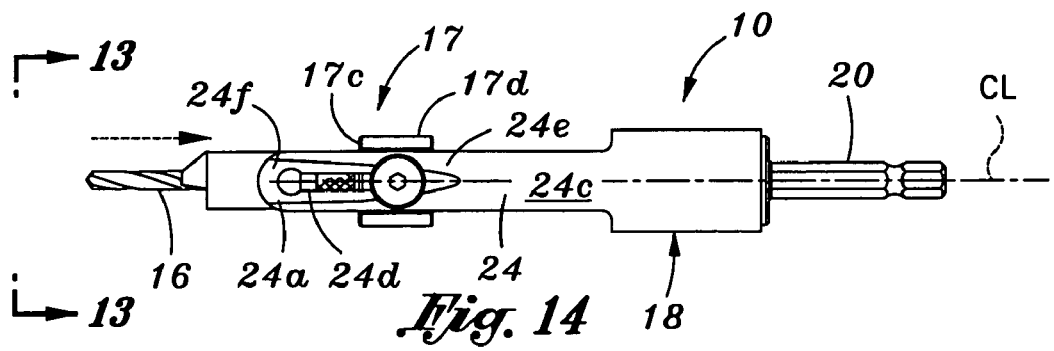
FIG. 14 is a side view of the tool shown in FIG. 1 illustrating the mounting member in a locked position, preventing the mounting member from being rotated.
Figure 15:
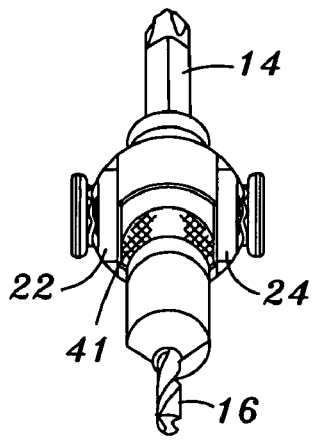
FIG. 15 is an end perspective view of the tool taken along line 15-15 of FIG. 16 as the mounting member is being rotated.
Figure 17:
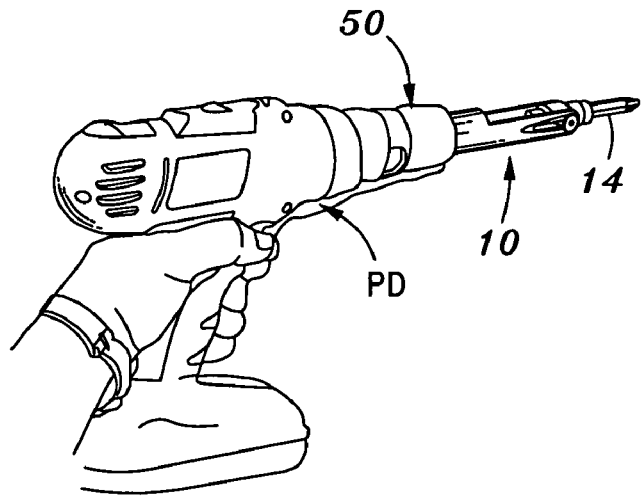
FIG. 17 is a perspective view of the tool of this invention attached to a power drill.
Figure 16:
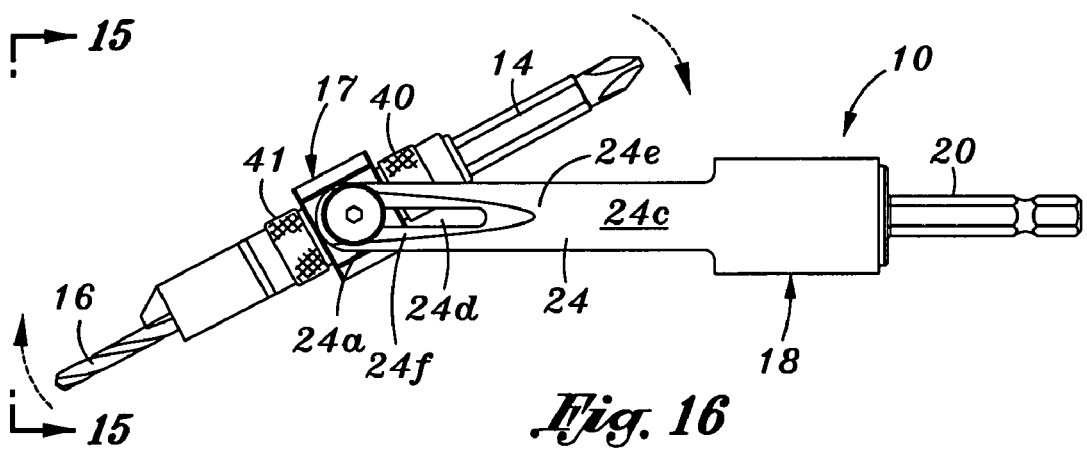
FIG. 16 is a side view of the tool shown in FIG. 1 as the mounting member is being rotated to move the drill element from an operational position into a non-operational position.

One embodiment of this invention the tool 10, shown best in FIGS. 1 and 2, includes a bifurcated body member 12 carrying an assembly of a driver element 14 and a drill element 16 detachably connected to a mounting member, for example, a block 17. The body member 12 has a pair of spaced apart substantially parallel arms 22 and 24. The block 17 is positioned between them to rotate either clockwise or counter-clockwise to reverse the axial orientation of the driver and drill elements 14 and 16. The body member 12 has a longitudinal centerline CL and includes a cylindrical rear portion 18 having attached thereto a shaft 20 that enables the tool 10 to be connected and disconnected to a power drill PD (FIG. 17). The driver and drill elements 14 and 16 and the shaft 20 are all axially aligned along the longitudinal centerline CL upon selecting the operational element, for example the driver element 14 has been selected as the operational element in FIGS. 3 and 6. As shown in FIGS. 3, 4, 5, and 12, the tool 10 is in an unlocked condition enabling the block 17 and its pivot member 32 to be manually rotated as a unit as shown in FIGS. 10, 15 and 16. As shown in FIGS. 6, 7, 8, 13, and 14, the tool 10 is in a locked condition preventing rotation of the block 17 and its pivot member 32.

The inward end of the shaft 20 has integral therewith an enlarged cube 20a that is forced fitted into a square shaped receptacle 18a in the end of the rear portion 18. A set screw (not shown) may be used to secure the cube 20a in position. A cylindrically shaped cavity 20b (FIGS. 2 and 6) within the cube 20a provides storage space for the driver element 14 or drill element 16, as the case may be, when the tool 10 is in the locked condition. The shaft 20 extends outward from the rear portion 18 in one direction along the centerline CL and the pair of arms 22 and 24 extend outward from the rear portion in an opposite direction to the shaft.

As illustrated in FIG. 2, the block 17 includes a pair of split, threaded compression collars 36 and 38 extending outward in opposite directions along the centerline CL. The driver element 14 is received within the collar 36 and drill element 16 is received within the collar 38. After inserting the driver element 14 and drill element 16 into the compression collars 36 and 38, thumbnuts 40 and 41 are, respectively, manually screwed onto the compression collars 36 and 38 to hold these elements 14 and 16 securely in position. Unloosening these thumbnuts 40 and 41 enables the drill element 24 and a driver element 26 to be manually removed and replaced as desired. The thumbnuts 40 and 41 may each comprise a cylindrical body having a passageway 40a with a threaded inner surface. The thumbnuts 40 and 41 may have a knurled outer surface.

Figure 11:
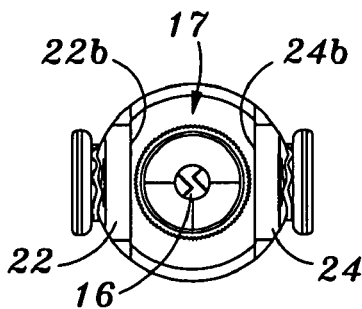
FIG. 11 is an end view taken along line 11-11 of FIG. 12.
Figure 12:
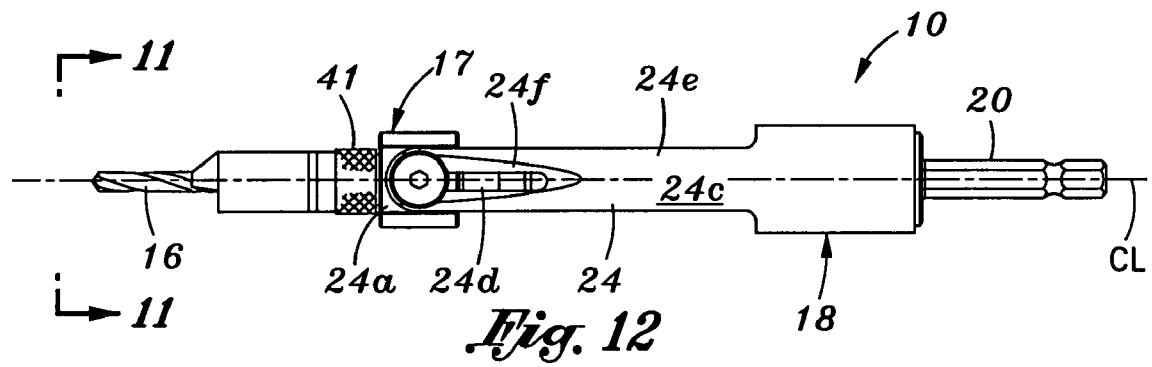
FIG. 12 is a side view of the tool shown in FIG. 1 illustrating the mounting member in an unlocked position, allowing the mounting member to be rotated as depicted in FIGS. 15 and 16.
Figure 13:
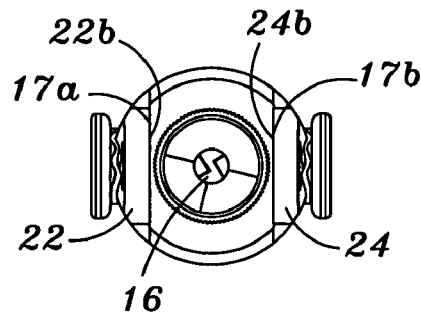
FIG. 13 is an end view taken along line 13-13 of FIG. 14.

The arms 22 and 24 straddle the centerline CL. Each arm 22 and 24 terminates in a free end 22a and 24a, respectively, and each arm has a substantially flat interior surface 22b (FIGS. 1 and 2) and 24b (FIGS. 4, 7, 11), respectively, an exterior surface 22c (FIGS. 3 and 6) and 24c (FIGS. 1 and 2), respectively, and a guide-way in the form of an elongated slit 22d and 24d, respectively. The interior surfaces 22b and 24b of the arms 22 and 24 are substantially parallel to each other, substantially equidistant from the centerline CL, and are spaced apart a predetermined distance $d_1$ (FIG. 2). Each exterior surface 22c and 24c tapers inward from intermediate portions 22e and 24e (FIGS. 3 and 6), respectively, of the exterior surfaces 22c and 24c to the free ends 22a and 24a to provide ramp sections 22f and 24f (FIGS. 3 and 6), respectively in the arms 22 and 24. The ramp sections 22f and 24f have substantially flat surfaces that may be sloped from substantially from 0 to 60 degrees. The elongated slits 22d and 24d, respectively, extend lengthwise along the ramp sections 22f and 24f.

Figure 5:
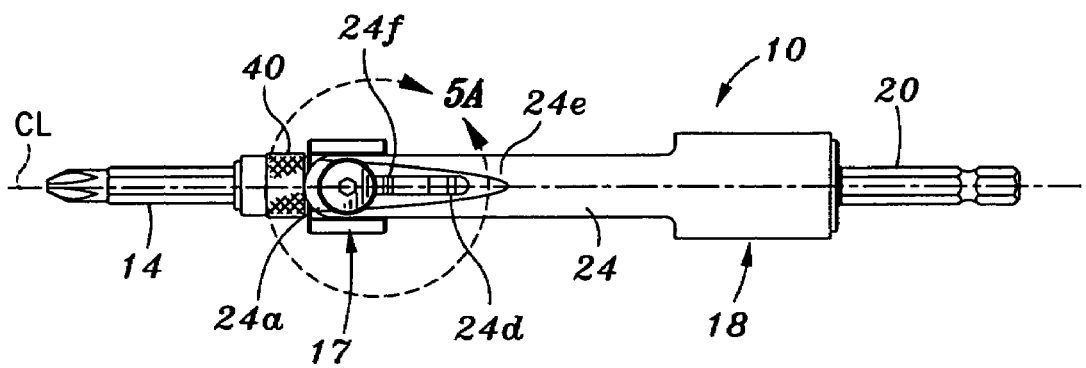
FIG. 5 is a side view of the tool shown in FIG. 1 illustrating the mounting member in an unlocked position, allowing the mounting member to be rotated as depicted in FIG. 10.
Figure 5A:
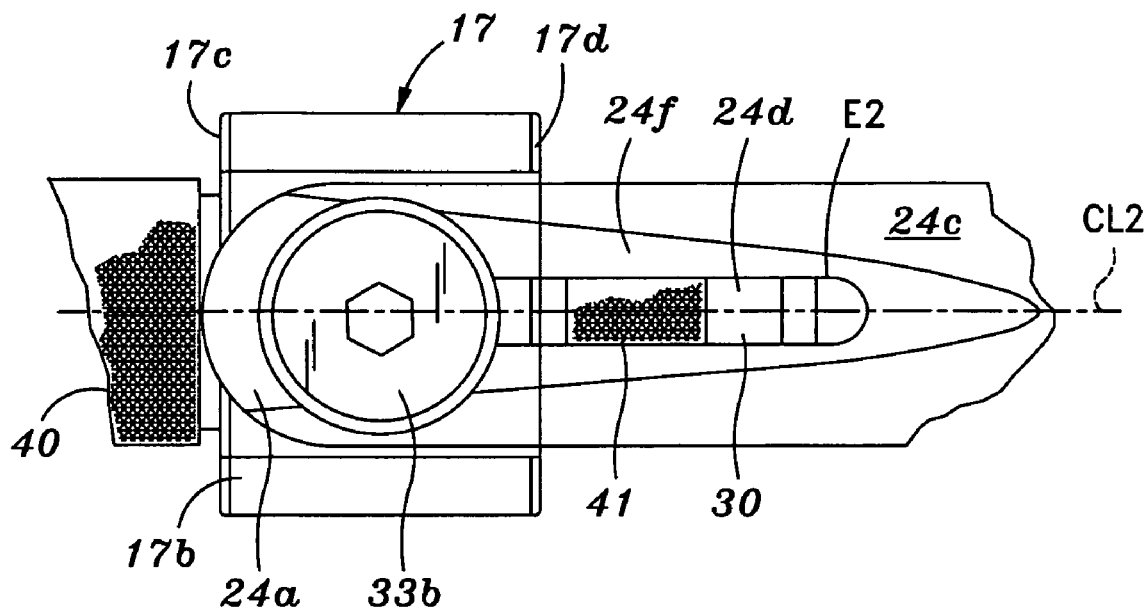
FIG. 5A is an enlarged fragmentary view taken along line 5A of FIG. 5.
Figure 5B:
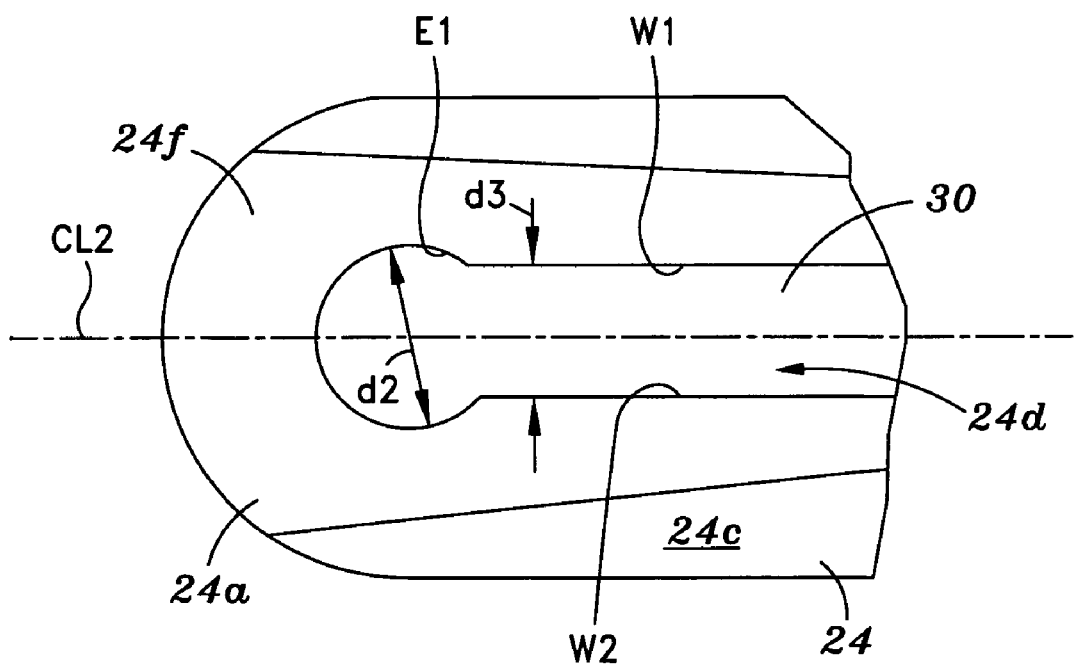
FIG. 5B is an enlarged fragmentary view of an end of one arm of the mounting member.
Figure 6:
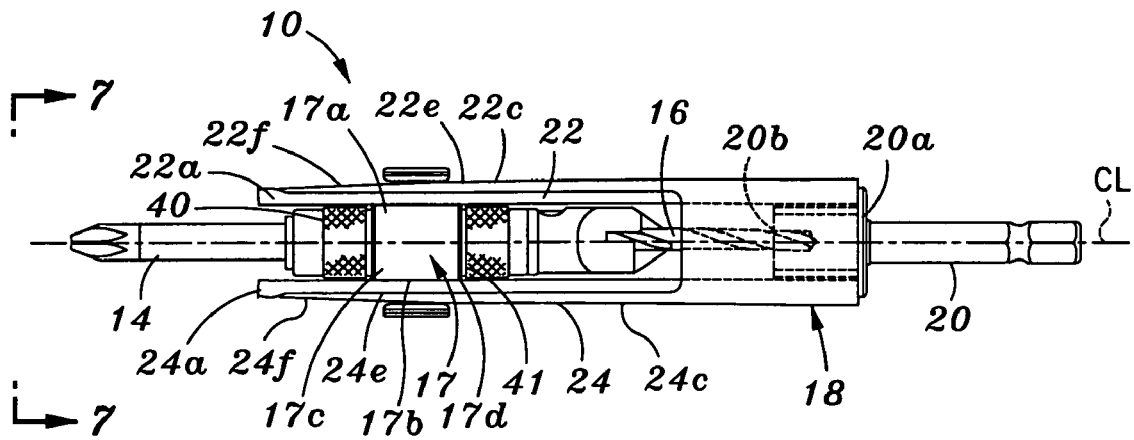
FIG. 6 is a top plan view of the tool shown in FIG. 1 illustrating the mounting member in a locked position, preventing the mounting member from being rotated.
Figure 7:
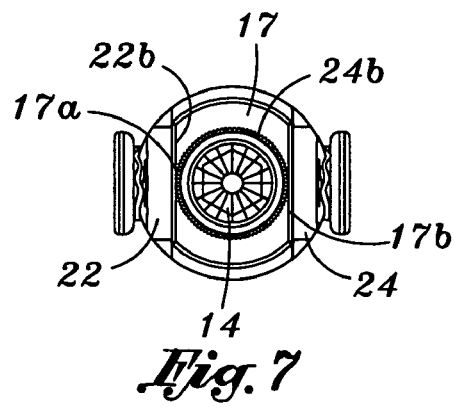
FIG. 7 is an end view taken along line 7-7 of FIG. 6.
Figure 16A:
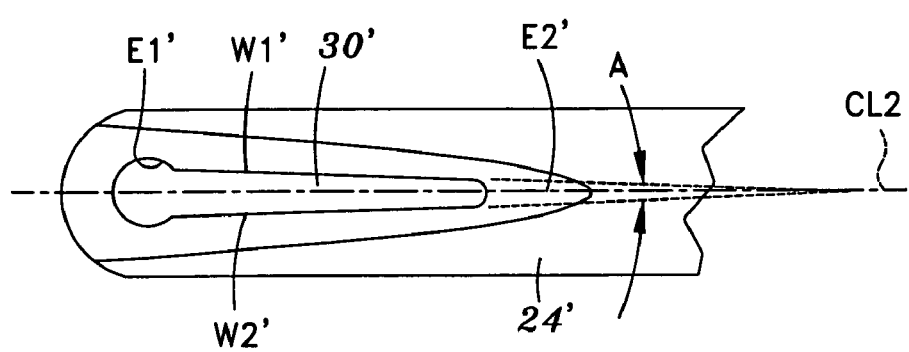
FIG. 16A is an enlarged fragmentary view of one arm of the mounting member of another embodiment of the tool of this invention.

The slits 22d and 24d in each arm 22 and 24 are directly opposed to each other and have essentially the same configuration and dimensions. Each slit 22d and 24d is substantially symmetrical about a longitudinal centerline CL2 (FIGS. 2, 5B, and 16A). As best shown in FIG. 2, each slit 22d and 24d has an outer end E1, an inner end E2, and a substantially linear corridor 30 connecting the outer and inner ends. The outer ends E1 are nearby the free ends 22a and 24a of the arms 22 and 24 in which the slits 22d and 24d are located. These outer ends E1 are configured as a segment of a circle having a diameter $d_2$ (FIG. 5B). Each inner end E2 is nearby the intermediate portions 22e and 24e of the exterior surfaces 22c and 24c of the arms 22 and 24 in which the slits 22d and 24d are located.

In different embodiments, the slits may have alternate shapes. In the tool 10, as best illustrated in FIG. 5B (which shows only the slit 24d), each slit 22d and 24d has opposed substantially flat walls W1 and W2 that are substantially parallel to each other. These walls W1 and W2 form the linear corridor 30 and are spaced apart a predetermined distance $d_3$ that is less than the diameter $d_2$ of circular segment forming the outer end E1 of the slits 22d and 24d. In an alternate embodiment depicted in FIG. 16A showing only the one arm 24', the corridors 30' of the slits have opposed walls W1' and W2' that taper inward slightly from the slits' respective outer ends E1' to their inner ends E2' to form an acute angle A between the inward tapering walls. This angle A is, for example, approximately 4°. Except for this slightly inward wall taper of the slits, both these embodiments of the tool of this invention are identical.

The block 17 is positioned between the free ends 22a and 24a of the arms 22 and 24. The block's pivot member 32 (FIG. 2) connects the block to the arms to enable the block and its pivot member 32 to move as a unit reciprocally between a first position near the free ends (the unlocked condition depicted in FIGS. 3, 4, 5, and 12) and a second position near the inner ends E2 of the slits 22d and 24d (the locked condition depicted in FIGS. 6, 7, 8, 13, and 14). The block 17 includes a first pair of substantially flat opposed sides 17a and 17b (FIGS. 4, 7, and 13) spaced apart a distance $d_4$ (FIG. 4) that is substantially equal to the distance $d_1$ (FIG. 2) between the interior surfaces 22b and 24b of the arms 22 and 24. A second pair of opposed sides 17c and 17d (FIGS. 3 and 6) of the block 17 are substantially at a right angle to the flat opposed sides 17a and 17b. The one flat side 17a faces the interior surface 22b of the arm 22 and the flat side 17b faces the interior surface 24b of the arm 24. These sides 17a and 17b and surfaces 22b and 24b slide past each other as the block 17 moves reciprocally between the first and second positions.

As best shown in FIG. 2, the pivot member 32 is oriented substantially at a right angle to the centerline CL and intersects this centerline. It has an elongated shaft 32a with opposed ends E3 and E4. As depicted best in FIG. 2A, the shaft 32a has an oblong cross-sectional configuration. Between the opposed shaft ends E3 and E4 are a pair of opposing flat surfaces 32b and 32c spaced apart a distance $d_5$ substantially equal to the distance $d_3$ between the opposed flat walls W1 and W2 of the slits 22d and 24d. Also between the opposed shaft ends E3 and E4 are a pair of opposing rounded surfaces 32d and 32e that lie along a circular path 39 (shown in dotted lines) having a diameter $d_6$ substantially equal to the diameter $d_2$ (FIG. 5B) of the circular segments of the outer ends E1 of the slits 22d and 24d.

Figure 8:
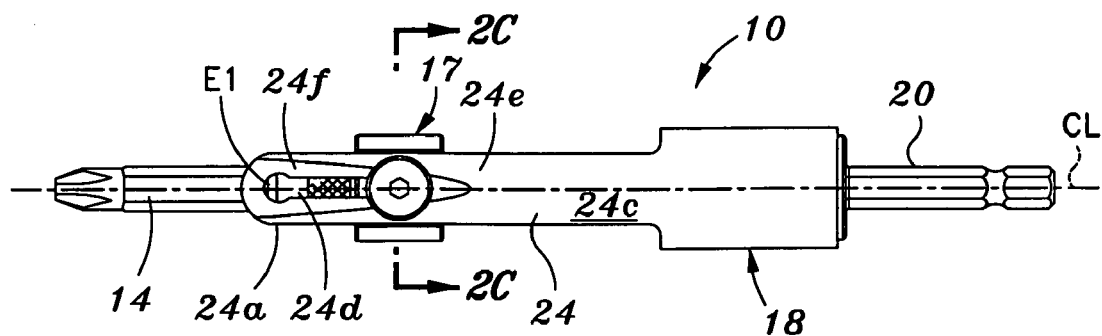
FIG. 8 is a side view of the tool shown in FIG. 1 illustrating the mounting member in a locked position, preventing the mounting member from being rotated.
Figure 9:
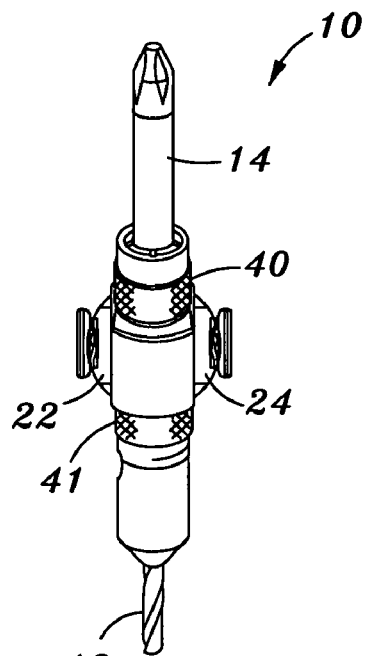
FIG. 9 is an end perspective view of the tool taken along line 9-9 of FIG. 10 as the mounting member is being rotated.

The pivot member 32 passes through an elongated, central passageway 44 in the block 17. This passageway 44 has an oblong cross-sectional configuration substantially identical to that of the oblong cross-sectional configuration of the shaft 32a. Thus, as illustrated in FIGS. 2B, 9, 10, 15, and 16, when the shaft 32a is lodged in the end E1 of the slits 22d and 24d, the block 17 and pivot member 32 may be rotated as a unit. As shown in FIGS. 2C and 8, when the shaft 32a is in the corridors 30, the flat surfaces 32b and 32c bear against the walls W1 and W2, preventing the block 17 and pivot member 32 from rotating as a unit, only allowing the block and pivot member to move as a unit reciprocally. When the shaft 20 and driver and drill elements 14 and 16 are in axially alignment and the block 17 is in unlocked position, the flat surfaces 32b and 32c are aligned with the entryway to the corridors 30 near the ends E1 of the slits 22d and 24d. This enables a user to move manually the assembly of the block 17 and driver and drill elements 14 and 16 inward towards the ends E2 of the slits 22d and 24d.

Attached to the shaft ends E3 and E4 respectively are caps 33a and 33b, which hold compression spring washers 35a and 35b at the shaft ends E3 and E4, respectively. The cap 33b is integral with the shaft 32a and a threaded tip T1 (FIGS. 2 and 2B) of the cap 33a is screwed into a threaded hole H1 (FIG. 2A) in the end E3 of the shaft 32a. The spring washer 35a is positioned between the cap 33a and ramp section 22f and the spring washer 35b is positioned between the cap 33b and the ramp section 24f. These washers 35a and 35b ride over the ramp surfaces as the block member moves between the unlocked position depicted in FIGS. 3, 4, 5, and 12 and the locked position depicted in FIGS. 6, 7, 8, 13, and 14. As the block 17 is moved from the unlocked position to the locked position, the compression spring washers 35a and 35b are compressed as they ride over the surfaces of the ramp sections 22f and 24f. When the pivot member 32 has been advanced to the end E2 of the slits 22d and 24d, the tool 10 is in a locked condition, holding the driver element 14 and drill element 16 in a selected axial orientation.

During manufacture of the tool 10, the cap 33a is turned until the amount of compression of the spring washers 35a and 35b is adjusted so that the shaft 32 is able to rotate when the block 17 is in the unlocked condition, but not so loose that the block 17 cannot be properly locked. When so adjusted, an adhesive is applied to the threaded tip T1 (FIGS. 2 and 2B) of the cap 33a to keep the cap 33a applying a steady force to achieve the desired compression of the 33b washers 35a and 35b. The caps 33a and 33b press the washers 35a and 35b firmly against the flat surfaces of the ramp sections 22f and 24f with increasing pressure as the block is moved between the unlocked and locked positions. In the locked position, the spring washers 35a and 35b are at maximum compression and in the unlocked position the washers are at minimum compression.

Due to the adjustment of the compression of the washers 35a and 35b, with the block 17 in the unlocked position, initially there is a minimum pressure between the ramp surfaces and washers 35a and 35b. So a user by applying only a little torque is enable to rotate the block 17 about the pivot member 32. This allows the user to change easily the positions of the drill element 16 and the drive element 14. The length of the exposed portions of the driver and drill elements 14 and 16 when connected to the block 17 is less than the length $l_1$ of a longitudinal space LS (FIG. 2) between and along the arms 22 and 24. Consequently, a user may rotate the block 17 when it is in the unlocked position either clockwise or counter-clockwise to reverse the axial orientation of the driver and drill elements 14 and 16. The exposed portions of the driver and drill elements 14 and 16 thus pass unobstructed between the arms 22 and 24 as they rotate. When the block 17 is in the locked position, the exposed portion of either the driver element 14 or drill element 16 is at least partially inserted into the cavity 20b.

A user picks the desired type and size bits (driver or drill elements) from an assortment. Then with the block 17 in the unlocked position and rotated to provide access to the compression collars 36 and 38 and the thumbnuts 40 and 41 loosened or removed, inserts the selected driver element 14 and drill element 16 into compression collars 36 and 38 and tightens the thumbnuts. Since the block 17 is in the unlocked position, the compression spring washers 35a and 35b are at least partially decompressed to enable the block and its pivot member 32 to rotate as a unit to reverse the axial orientation of the driver and drill elements 14 and 16. The user rotates the block 17 to select or reverse the axial orientation of the selected driver element 14 and drill element 16, aligning the shaft 20 and driver and drill elements. This orients the pivot member 32 so the opposing flat surfaces 32b and 32c of the shaft 32a are at the entryway of the corridors 30 of the slits 22d and 24d and in alignment with the walls W1 and W2. From the unlocked position, the user next moves the assembly of the block 17, including its pivot member 32, driver and drill elements 14 and 16 inward towards the ends E2 of the slits 22d and 24d. As this assembly advances the aligned opposing flat surfaces 32b and 32c slide past the opposed flat walls W1 and W2 of the slits 22d and 24d. This gradually increases the compression of the spring washers 35a and 35b and moves the exposed portion of the non-operative driver or drill element into the cavity 20b, locking the assembly of the block 17, its shaft 32, and driver and drill elements 14 and 16 in the position shown in FIGS. 6, 7, 8, 13, and 14.

As depicted in FIG. 17, the tool 10 is connected to the power drill PD by inserting the shaft 20 into the power drill's chuck 50 that is tightened to grip the tool tightly. The power drill PD rotates the tool 10 at high rate, creating a centrifugal force that reinforces the action of the spring washers 35a and 35b to maintain the locked condition of the tool. The combination of the ramp sections 22f and 24f and configuration of the slits 22d and 24d assists is achieving and maintaining precise axial alignment of the shaft 20 and driver and drill elements 14 and 16 with the centerline CL as the tool 10 revolves.

Supplemental Locking Mechanism

Figure 18:
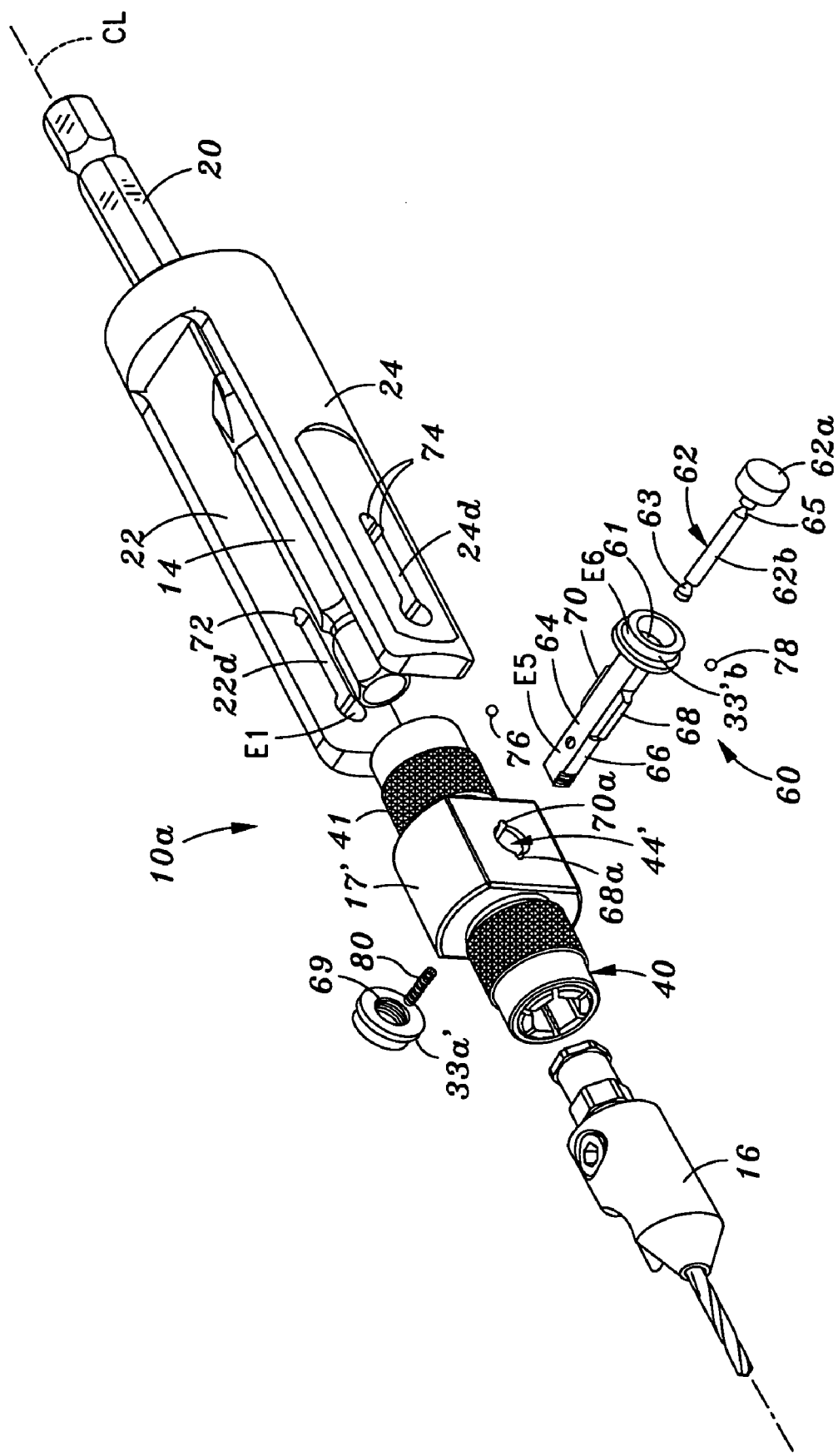
FIG. 18 is an exploded perspective view of another embodiment of the tool of this invention using a detent locking mechanism.
Figure 19:
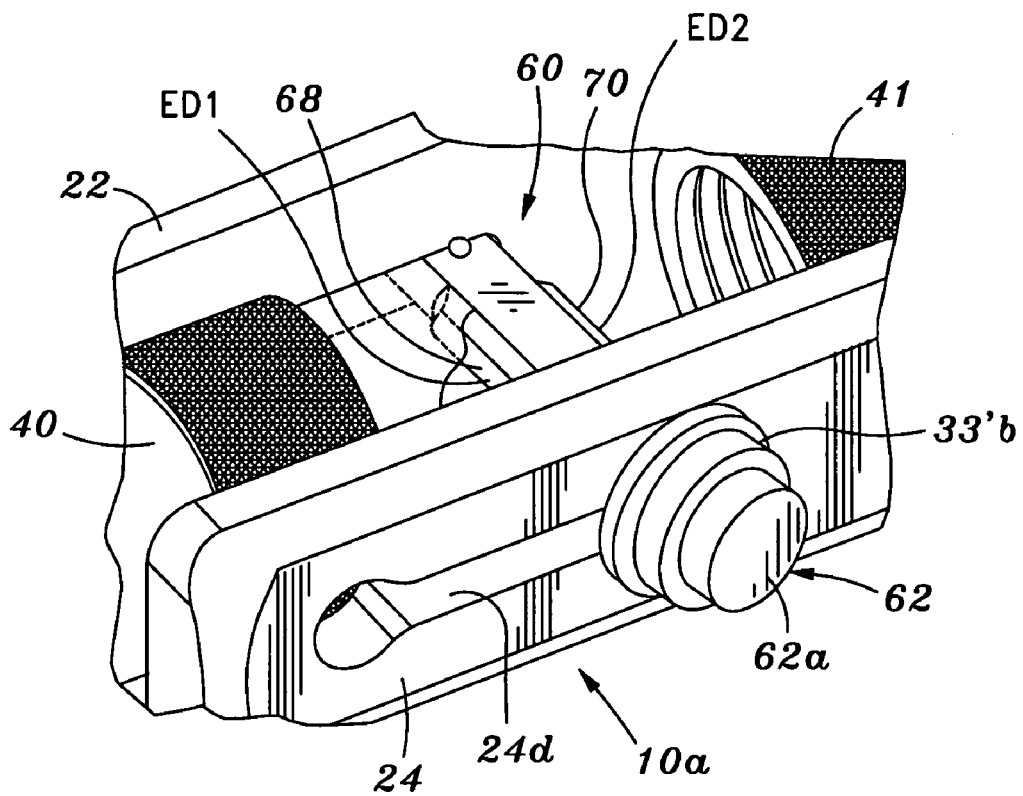
FIG. 19 is a fragmentary perspective view looking at one side of the detent locking mechanism used with the tool shown in FIG. 18.
Figure 20:
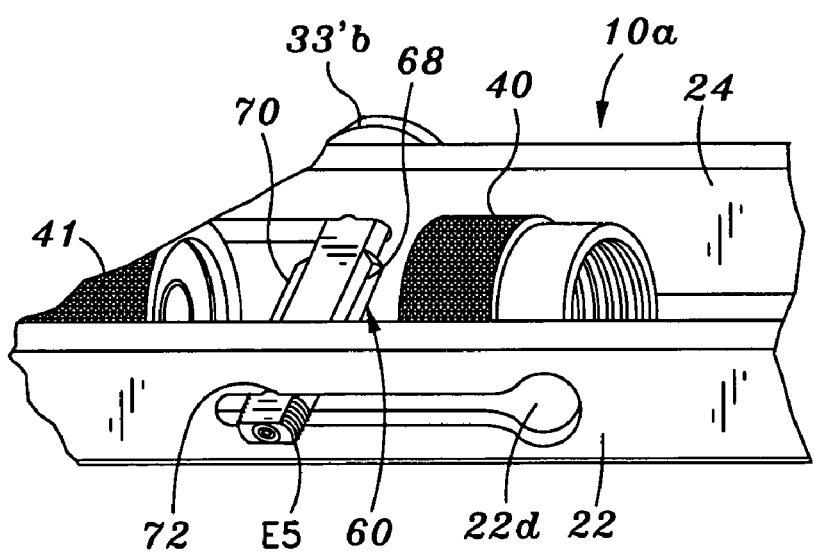
FIG. 20 is a fragmentary perspective view looking at the other side of the detent locking mechanism used with the tool shown in FIG. 18.

As illustrated in FIGS. 18 through 21A, another embodiment of this invention the tool 10a uses a detent locking mechanism 60 to assist in retaining this tool in a locked condition. This supplemental locking mechanism is an optional feature. In this embodiment the driver element 14 and drill element 16 are connected to a block 17' that is mounted between the parallel arms 22 and 24 in a manner substantially the same as the block 17 of tool 10 is mounted. The block 17' is similar to the block 17, with the main difference being that the block 17' has a passageway 44' with a cross-sectional configuration shaped different than the cross-sectional configuration of the passageway 44 of block 17. In FIGS. 19 and 20 the block 17' is either broken away or completely removed to better understand the structure and operation of the detent locking mechanism 60.

Another difference between the tool 10 and the tool 10a is that an pivot member 32' is employed that functions in a manner like that of the pivot member 32, but has a hollow interior that provides a channel 61 for an elongated release element 62 of the detent locking mechanism 60. As shown in FIG. 18, the pivot member 32' has a threaded end E5 to which is attached a closed cap 33'a. An open cap 33'b is integral with the end E6 of the pivot member 32'. The channel 61 extends lengthwise all the way through pivot member 32' between the ends E5 and E6, allowing opposed end portions of the release element 62 to project from each of these ends. The release element 62 has an enlarged cylindrical head 62a at one end of a shaft 62b with a pair of annual recesses 63 and 65 near each end of the shaft. A circular opening in the cap 33'b has a diameter substantially equal to the diameter of the cylindrical head 62a. With the release element 62 extending into the pivot member 32' the enlarged cylindrical head 62a at least partially projects outward to provide a button member. A spring 80 is inserted between the cap 33'a and the end E5 of the pivot member 32' at least partially extending into the channel 61 and engaging the end of the release element 62 with the recess 63 therein.

In essentially the same way as in tool 10, the caps 33'a and 33'b hold compression spring washers 35a and 35b (not shown in FIGS. 18-20) at the shaft ends E5 and E6, respectively, of the pivot member 32'. The opposed top 64 and bottom 66 of the pivot member 32' are substantially flat, and projecting outward from its opposed sides are centrally located wing members 68 and 70 having rounded edges ED1 and ED2 (FIG. 14). The rounded edges ED1 and ED2 of the wings 68 and 70, enable the block 17' and pivot member 32' to rotate as a unit when at the ends E1 of the arm 22 and 24 and prevent rotation the block 17' and pivot member 32' as a unit when the pivot member is in the corridor 30.

The cross-sectional configuration of the passageway 44' has opposed channels 68a and 70a that accommodate the wing members 68 and 70 of the pivot member 32', enabling the pivot member to slide into the passageway 44' with the end E5 extending through both the block 17' and the circular end E1 of the slit 22d of the arm 22. The end E6 of the pivot member 32' projects outward from the circular end E1 of the slit 24d of the arm 24. The cap 33'a has an internal thread 69 for connecting this cap to the threaded end E5. The inner end E2 of the slit 22d has a locking groove 72 in its upper wall and the inner end E2 of the slit 24d has a locking groove 74 in its lower wall. Balls 76 and 78 are respectively received in these locking grooves 72 and 74.

Figure 21:
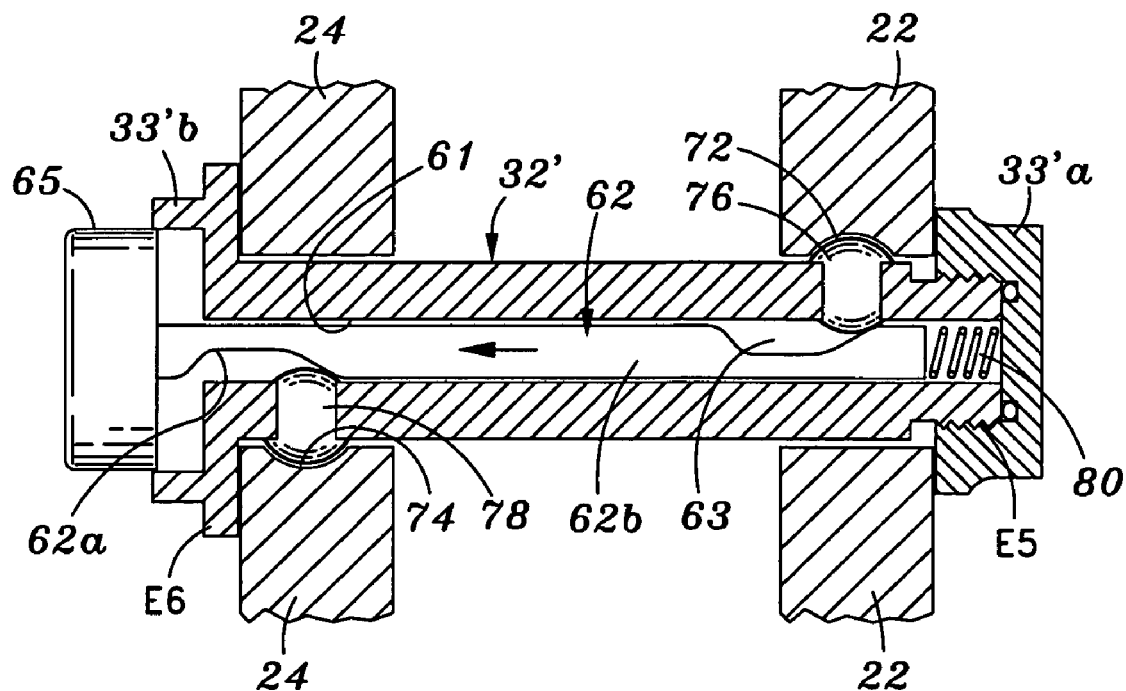
FIG. 21 is a cross-sectional view taken along line 21-21 of FIG. 19 showing the detent locking mechanism in a locked condition.
Figure 21A:
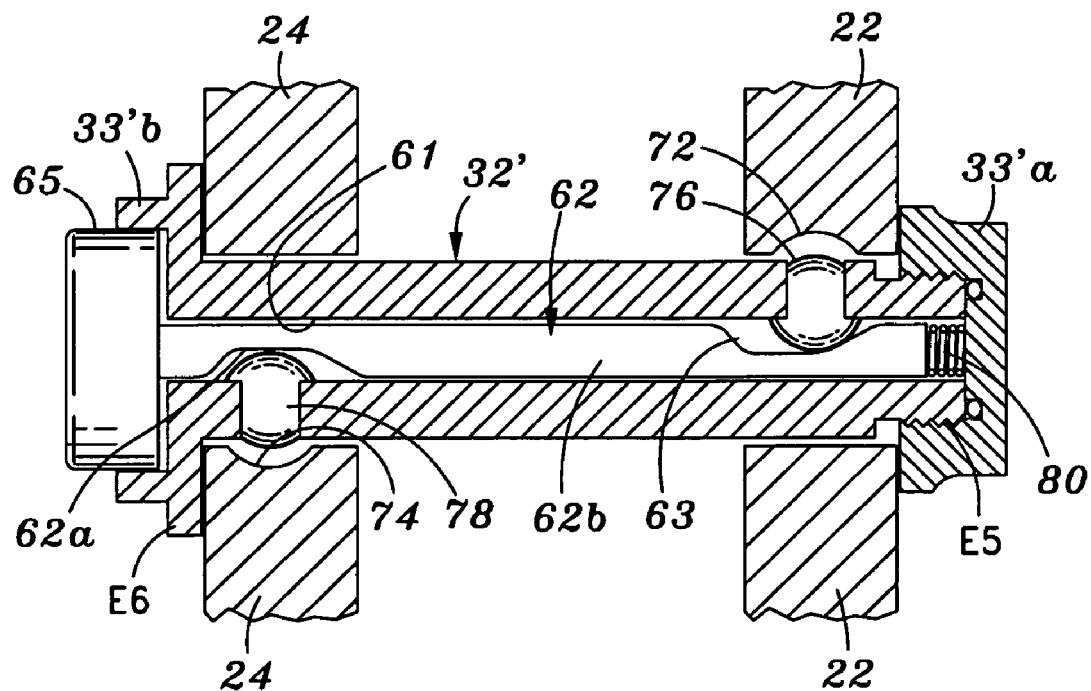
FIG. 21A is a cross-sectional view similar to that of FIG. 21 showing the detent locking mechanism in an unlocked condition.

FIG. 21 shows the detent locking mechanism in the locked condition where the spring 80 pushes the release element 62 outward so that the ball 76 is in alignment with and seated in the groove 72 and the ball 78 is in alignment with and seated in the groove 74. The balls 76 and 78 thus engage the arms 22 and 24, preventing movement of the block 17'. When the users pushes the cylindrical head 62a of the release element 62 inward as depicted in FIG. 21A, the balls 76 and 78, respectively, move into the the pair of annual recesses 63 and 65. This unlocks the detent locking mechanism, enabling the user to move the block 17' outward towards the ends E1 of the arms 22 and 24.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

The invention claimed is:

1. A tool including a body member having a shaft extending outward therefrom in one direction and a pair of spaced apart substantially parallel arms extending outward therefrom in an opposite direction, each said arm terminating in a free end and having an exterior surface that tapers inward from an intermediate portion of the exterior surface to the free end to provide a ramp section, and an elongated slit therein extending lengthwise along the ramp section, said slit having an outer end nearby the free end and an inner end nearby the intermediate portion of the exterior surface, a block member including opposed first and second sides, a driver element detachably connected to the first side, and a drill element detachably connected to the second side, said driver element and drill element being aligned and axially oriented in opposed directions, said block member positioned between the free ends of the arms and connected thereto by a pivot member having opposed ends, said opposed ends positioned with one end in each slit to enable the block member to be manually moved reciprocally between a first position near the free ends to a second position near the inner ends of the slits, with the pivot member riding along the slits, in the first position said block member being enabled to be rotated to reverse the axial orientation of the driver and drill elements, and in the second position said block member being locked to prevent rotation and hold the driver and drill elements in a selected axial orientation.

2. The tool of claim 1 where the slits in each arm are directly opposed to each other and have essentially the same dimensions and each has opposed walls that are substantially parallel to each other.

3. The tool of claim 1 where each slit is substantially symmetrical about a longitudinal centerline.

4. The tool of claim 1 where the slits in each arm are directly opposed to each other and have essentially the same dimensions and each slit has opposed walls that taper inward from the outer end of the slit to the inner end of the slit to form an angle between the tapering walls that is greater than 0.5 degrees.

5. The tool of claim 4 where each slit is substantially symmetrical about a longitudinal centerline.

6. The tool of claim 1 including a spring member that is at least partially compressed as the block member moves from the first position to the second position and is at least partially decompressed as the block member moves from the second position to the first position.

7. The tool of claim 1 including a supplemental locking mechanism nearby the inner end of at least one of the slits.

8. The tool of claim 7 where the supplemental locking mechanism comprises a detent mechanism as a portion of the pivot member.

9. A tool including a bifurcated body providing a pair of spaced apart substantially parallel arms, each said arm terminating in a free end and having an exterior surface including a substantially flat ramp section tapering inward from an intermediate portion of the exterior surface to the free end to provide a ramp section and an elongated slit therein extending lengthwise along the ramp section, each said slit having an outer end nearby the free end of the arm in which it is located and an inner end nearby the intermediate portion of the arm in which it is located, said slits in each arm being directly opposed to each other and each having essentially the same configuration, a block member adapted to detachably connect a drill element to a first side of the block member and to detachably connect a driver element to a second side of the block member opposite said first side, upon connecting to the block member said drill and drive elements being aligned and axially oriented in opposed directions, said block member positioned between the free ends of the arms and connected thereto by a pivot member having opposed ends, said opposed ends positioned with one end in each slit to enable the block member to be manually moved reciprocally between a first position near the free ends to a second position near the inner ends of the slits, in the first position said block member being enabled to be rotated to reverse the axial orientation of the driver and drill elements, and in the second position being locked to prevent rotation and hold the driver and drill elements in a selected axial orientation, and at least one spring member at least partially compressed as the block member moves from the first position to the second position and is at least partially decompressed as the block member moves from the second position to the first position.

10. The tool of claim 9 where the slits have opposed walls which are substantially parallel to each other.

11. The tool of claim 10 where each slit is substantially symmetrical about a longitudinal centerline.

12. The tool of claim 9 where the slits have opposed walls that taper inward from the outer end of the slit to the inner end of the slit to form an angle between the opposed walls that is greater than 0.5 degrees.

13. The tool of claim 9 including a supplemental mechanism nearby the inner end of at least one of the slits.

14. The tool of claim 13 where the supplemental locking mechanism comprises a detent mechanism as a portion of the pivot member.

15. A tool including
a body member having a longitudinal centerline and a shaft adapted to be connected to a power drill and extending outward therefrom in one direction along the centerline and a pair of spaced apart substantially parallel arms extending outward therefrom in an opposite direction to the shaft and straddling the centerline,
and each said arm terminating in a free end and each arm having
a substantially flat interior surface,
an exterior surface that tapers inward from an intermediate portion of the exterior surface to the free end to provide a ramp section with a substantially flat surface, and
an elongated slit therein extending lengthwise along the ramp section,
said interior surfaces of the arms being substantially parallel to each other, substantially equidistant from the centerline, and spaced a part a predetermined distance,
each said slit having an outer end, an inner end, and a substantially linear corridor connecting the outer and inner ends,
each said outer end being nearby the free end of the arm in which it is located and configured as a circular segment having a predetermined diameter, and each said inner end being nearby the intermediate portion of the exterior surface of the arm in which it is located,
said corridor of each slit comprising a pair of opposed flat walls spaced apart a predetermined distance that is less than the predetermined diameter of said circular segment of the slit,
a block member including a first pair of substantially flat opposed sides spaced apart a distance substantially equal to said predetermined distance between the interior surfaces of the arms and a second pair of opposed sides substantially at a right angle to said flat opposed sides of said first pair,
said block member positioned between the free ends of the arms with one flat side of the pair of flat opposed block member sides facing the interior surface of one arm and the other flat side of the pair of flat opposed block member sides facing the interior surface of the other arm,
a pivot member connecting the block member to the arms to enable the block member to move reciprocally between a first position near the free ends of the arms and a second position near the inner ends of the slits and to rotate when in the first position, said pivot member oriented substantially at a right angle to the centerline and having an elongated shaft with opposed ends, each opposed shaft end having thereat a compression spring element located to ride over the ramp section as the block member moves between the first and second positions, said shaft having between said opposed shaft ends a pair of opposing flat surfaces and a pair of opposing rounded surfaces, said opposing flat surfaces spaced apart a distance substantially equal to said predetermined distance between the opposed flat walls of the slits and said rounded surfaces lying along a circular path having a diameter substantially equal to said predetermined diameter of the circular segments of the outer ends of the slits, said block member when in the first position said compression spring elements being at least partially decompressed to enable said block member to rotate to reverse the axial orientation of the driver and drill elements, and when positioned to align the opposing flat surfaces of the shaft with the opposed flat walls of the slits being enabled to be moved manually from the first position into the second position, as said block member is moved from the first position to the second position said compression spring elements being compressed as said spring elements ride over the ramp section to lock the block member in the second position, holding the driver and drill elements in a selected axial orientation.

16. A tool including a pair of spaced apart substantially parallel arms, each arm having a free end, a tapered ramp section, and an elongated guide-way therein extending along the ramp section, a mounting member carrying axially oriented driver and drill elements, said mounting member being attached to the arms by a pivot member seated in the guide-ways and movable reciprocally along the guide-ways between a first position near the free ends of the arms and a second inward position, said mounting member being manually rotatable when in the first position, and a compression spring element carried by the mounting member to ride over the ramp section as the mounting member moves from the first position to the second position to be compressed to lock the mounting member in the second position, holding the driver and drill elements in a selected axial orientation until the mounting member is return to the first position.

17. A tool including
a pair of spaced apart substantially parallel arms,
mounting means attached to the parallel arms for detachably connecting thereto axially oriented driver and drill elements extending outward from the mounting means in opposite directions,
said mounting means moveable along the arms reciprocally between a first position where it is manually rotated to select the axial orientation of the driver and drill elements and a second locked position to hold the driver and drill elements in a selected axial orientation until the mounting member is return to the first position, and
locking means for locking the mounting means in the second position, said locking means including a spring element actuated upon the mounting means being moved from the first position to the second position to apply pressure against the mounting means while in the second position.

18. The tool of claim 17 where the locking means include on one arm a ramp section that is interactive with the spring element to place the spring element in compression as the mounting means is moved from the first position to the second position and decompress the spring element as the mounting means is moved from the second position to the first position.

19. A tool including a pair of arms each including means for providing an elongated guide-way, means for carrying axially oriented driver and drill elements, said carrying means being attached to the arms to move in the guide-ways reciprocally between a first position enabling said carrying means to rotate to move the driver and drill elements in a selected axial orientation and a second position where said carrying means is prevented from rotating, and means for applying pressure to the said carrying means when in the second position to hold the driver and drill elements in the selected axial orientation until the mounting member is returned to the first position, where the pressure applying means comprise on one arm a ramp section that is interactive with a spring element to place the spring element in compression as the carrying means is moved from the first position to the second position and decompress the spring element as the carrying means is moved from the second position to the first position.

* * * * *

UNITED STATES PATENT AND TRADEMARK OFFICE
CERTIFICATE OF CORRECTION

| | | |
|---|---|---|
| PATENT NO. | : 7,404,563 B2 | Page 1 of 1 |
| APPLICATION NO. | : 11/364287 | |
| DATED | : July 29, 2008 | |
| INVENTOR(S) | : Hector Ray Hernandez, Jr. et al. | |

It is certified that error appears in the above-identified patent and that said Letters Patent is hereby corrected as shown below:

Title Page, item (57); ABSTRACT, line 9, delete "return" and insert --returned--.

Column 1, line 59, delete "return" and insert --returned--.

Column 2, line 59, delete "taken line" and insert --taken along line--.

Column 4, line 18, delete "forced".

Column 6, line 46, delete "enable" and insert --able--.

Column 11, line 45, delete "return" and insert --returned--.

Column 12, line 12, delete "return" and insert --returned--.

Signed and Sealed this

Eighth Day of September, 2009

David J. Kappos
*Director of the United States Patent and Trademark Office*